E. C. HORNER.
WHEEL FOR ROAD VEHICLES.
APPLICATION FILED OCT. 27, 1911.
1,017,973.
Patented Feb. 20, 1912.
2 SHEETS—SHEET 1.
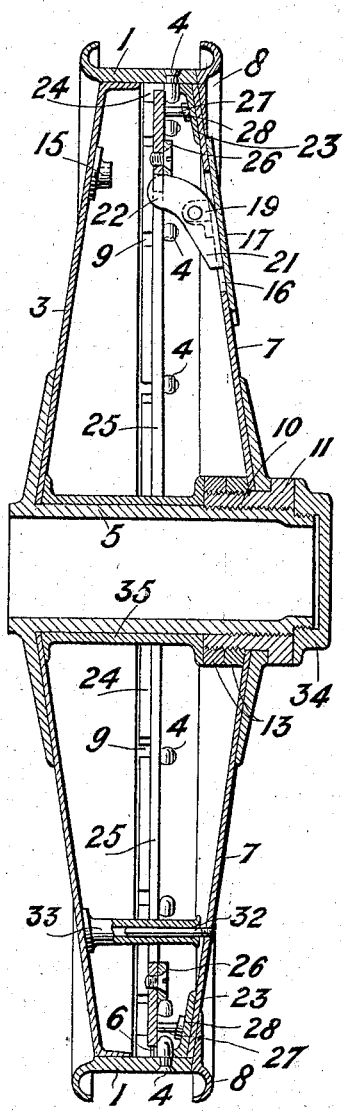
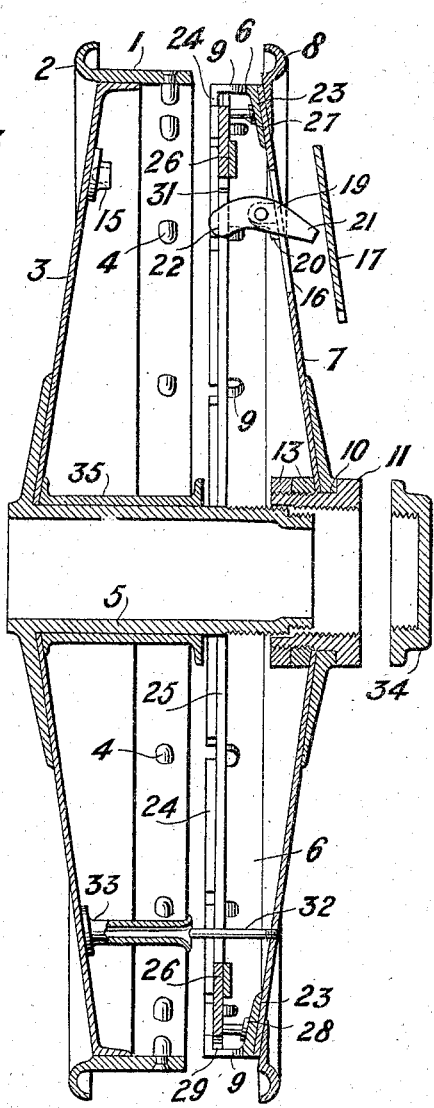

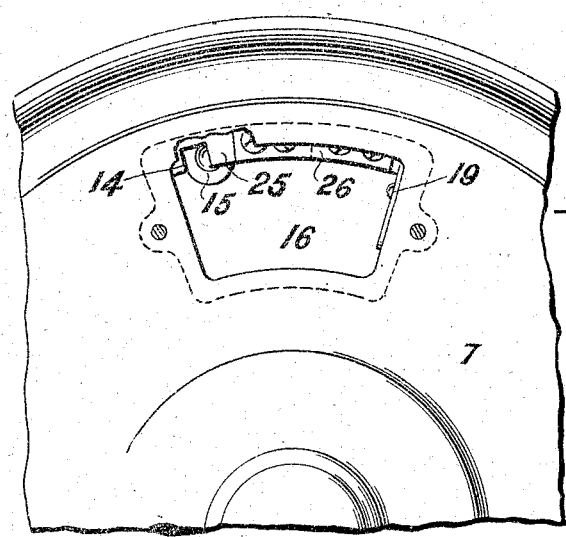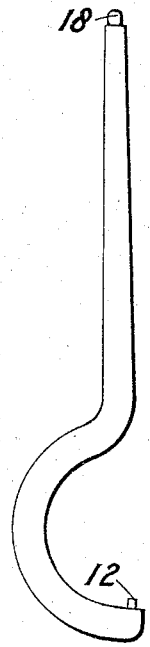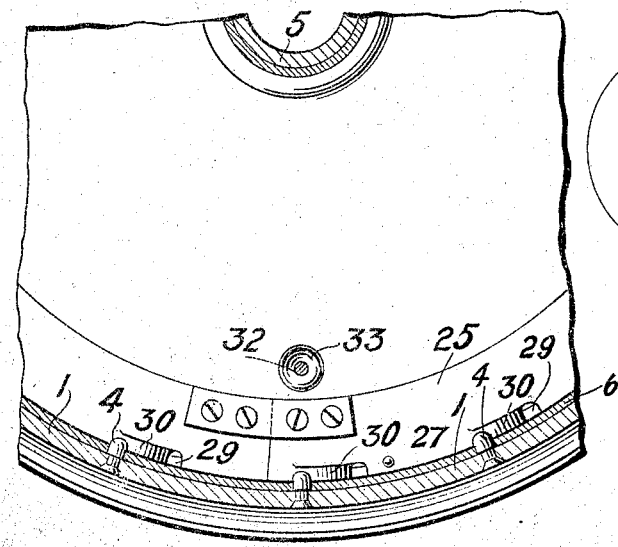

UNITED STATES PATENT OFFICE.

EDGAR CHARLES HORNER, OF CLAPHAM PARK, LONDON, ENGLAND.

WHEEL FOR ROAD-VEHICLES.

1,017,973.  Specification of Letters Patent.  Patented Feb. 20, 1912.

Application filed October 27, 1911. Serial No. 657,131.

*To all whom it may concern:*

Be it known that I, EDGAR CHARLES HORNER, a subject of the King of Great Britain, residing at Clapham Park, in the county of London, England, have invented a certain new and useful Improved Wheel for Road-Vehicles, and of which the following is a specification.

This invention relates to wheels for road vehicles, and has for its object to provide an improved construction, whereby the ready removal and replacement of the tire upon the rim of the wheel is facilitated.

The felly or rim of the wheel to which this invention refers is formed in two portions, one of which is fixed to the hub of the wheel and constitutes the inner part of the rim, that is that portion which is next to the body of the vehicle, the other and outer portion of the rim being removable from the said inner portion according to this invention by a movement only in a direction parallel to the axis of the wheel. Each rim portion comprises an outwardly projecting tire retaining flange carried on one edge of a flat ring or short cylinder, the ring of the removable portion of the rim being a sliding fit within the inner periphery of the ring fixed to the hub of the wheel, and the removable ring is formed with slots extending parallel with the axis of the wheel, said slots being adapted to be engaged by inwardly projecting radial pins on the fixed ring, means being provided to lock the fixed and removable rings together when such engagement is effected, without turning either part of the rim about the axis of the wheel.

The invention will be more particularly described with reference to the accompanying drawings, in which:

Figure 1 is a transverse section through a wheel with the parts assembled, Fig. 2 is a similar view showing the parts disconnected, Fig. 3 is a side elevation of the upper portion of the wheel shown at Fig. 1, Fig. 4 a sectional elevation of the lower portion of the wheel shown at Fig. 1, and Fig. 5 shows a suitable form of tool employed in assembling and disconnecting the wheel parts.

The fixed portion of the rim which forms the seat for the tire, comprises a short cylinder or outer metal ring 1 provided with the inner tire-retaining flange 2, and is connected to a circular disk 3 forming the inner side of the wheel, and has radial pins 4 projecting inwardly from the inner periphery of the ring 1 near the outer edge distant from the disk 3, and at regular intervals apart, and the disk 3 is at its center fixed to the hub 5 of the wheel. Adapted to be slid within the inner periphery of the outer ring 1 is an inner ring 6, one edge of which is connected in a suitable manner as by a flange 23 to the inner surface of the outer wheel disk 7, while the other edge of the ring 6 is formed with an inturned flange 24 and connected in any suitable manner to the wheel disk 7 is the outer tire-retaining flange 8. The outer disk 7 is formed with a central aperture, (strengthened around the edge by an additional plate of metal) and the central aperture receives a tubular sleeve 10 having a flange 11 and nuts 13 to retain the disk 7 in position relative to the sleeve 10 and whereby the sleeve 10 can be revolved relatively to the disk 7.

The hub 5 is screw-threaded on its end and the interior of the sleeve 10 is also threaded, so that it can be screwed on to the hub 5 without revolving the disk 7, and consequently the latter and its flanged ring 6 are thereby slid in the axial direction into the outer ring 1. To enable the sleeve 10 to be turned to screw it up, the flange 11 may be formed with flat faces to be engaged by a wrench or the like, or the edge of the flange 11 may be circular and formed with one or more holes to be engaged by a pin 12 on the end of such a tool as is shown at Fig. 5.

Passing through the flange 24 and into the ring 6 are a plurality of slots 9, which extend only in a direction parallel to the axis of the wheel and coincide in position with the pins 4 on the ring 1. Located between the flange 24 of the ring 6 and the wheel disk 7, is an annular plate 25 extending in a plane at right angles to the axis of the wheel and which is rotatable within the said ring 6. This annular plate may be made in segments and connected by segmental plates 26. Two or more studs 27 are provided on the plate 25, the outer ends of which studs bear against the inner wall of the flange 23 of the ring 6, and hold the plate 25 against the inner face of the flange 24, stops 28 being provided on the flange 23, against which the studs 27 abut when the plate 25 is rotated in one direction to prevent the said ring being rotated too far when taking the wheel apart or when placing the parts of the wheel in position ready for locking. Peripheral notches 29 are formed on the outer edge of the annular plate 25 at the same distance apart as the slots 9 in the ring 6 which are as before stated equidistant, and coincide with the inwardly projecting pins 4 on the outer ring 1. When the plate 25 has been rotated within the flanged ring 6 so as to bring the notches 29 into alinement with the slots 9 in said ring, the said ring carried by the outer disk 7 to which the outer tire-retaining flange 8 is attached, may be slid within the outer ring 1 and the pins 4 caused to engage the slots 9. The annular plate 25 is then located between the flange 24 and the pins 4, the said pins having passed through the notches 29 in the plate 25.

In order to prevent the pins 4 leaving the slots 9 in the inner flanged ring 6 when the wheel parts are assembled, the annular plate 25 is partially rotated so as to close the slots 9, portions of the plate 25 between the notches 29 therein then bearing upon the rear faces of the pins 4 and retaining the pins in the said slots. The annular plate 25 may be formed on one side of each of the notches 29 with an inclined surface 30, see Fig. 4, in order that when the plate 25 is rotated to retain the pins 4 in the slots 9, the inclined surfaces 30 act upon said pins in a wedge-like manner, to wedge the plate 25 firmly between the inner face of the flange 24 and the pins 4, and thus draw the removable portion of the rim toward the fixed portion. Any suitable means may be employed for rotating the plate 25 within the inner flanged ring 6. The arrangement which is illustrated in the accompanying drawings has been found very convenient, and consists in forming a notch 14 in the said plate 25, and providing the inner face of the disk 3 with a socket 15 which comes approximately into alinement with the notch 14 when the outer disk 7 is *in situ*. A segmental opening 16 is formed near the outer edge of the disk 7, and which opening is of such a size as to enable the socket 15 to be seen therethrough, this opening 16 being normally covered by a cover plate 17 attached in any suitable manner, as by screws or the like, to the outer surface of the disk 7. The end 18 of the tool shown in Fig. 5, is suitably shaped to engage the socket 15 on the inner surface of the disk 3, while the slightly tapered portion of the tool engages the notch 14 in the plate 25.

The method of using this tool is as follows: The cover plate 17 of the opening 16 having been removed, the end 18 of the tool is inserted into the socket 15 and the tapered portion of the tool caused to engage the notch 14 in the annular plate 25. The tool is then moved in the direction in which it is desired to move the plate 25, its end 18 engaging the socket 15, in which socket the end of the lever forms a fulcrum, thus causing the said plate to be turned, relatively to the removable portion of the rim and the pins 4, in the direction required according to whether it be desired to take the wheel apart or to secure the parts thereof together.

To prevent the plate 25 rotating when the wheel has been built up, there is provided a two-armed locking lever 19 pivoted to the inner face of the disk 7 or to a bracket 20 secured thereto, and this lever is so located at one side of the segmental opening 16, that when the cover plate 17 is removed, the end 21 of the lever 19 can move outwardly, the shape and size of this lever being such that its outer edge coincides with the inner surface of the cover plate 17 when the lever 19 is in the correct position to lock the annular plate 25 so as to retain the pins 4 in the slots 9, which it does by its end 22 engaging a notch 31, see Fig. 2, formed in the inner periphery of the plate 25. The notch 31 is so located in the plate 25 that it is not until the said plate has been rotated so as to close the entrance to the slots 9, to retain the pins 4 therein, that the said notch 31 registers with the end 22 of the locking lever. It will therefore be seen that with this construction, the cover plate 17 cannot be replaced to cover the opening 16 in the outer disk 7, until the locking end of the lever 19 engages the notch 31, thus allowing the outer edge of the lever to lie flush with the outer surface of the outer disk 7.

For the purpose of insuring the correct position of the slots 9 in the ring 6 with respect to the pins 4 projecting from the inner periphery of the ring 1 when placing the wheel parts together, an inwardly projecting pin 32 is provided on the outer disk 7, which is adapted to engage a tubular socket 33 projecting from the inner surface of the disk 3, the length of the pin and socket being such that when placing the removable portion of the wheel on to the fixed portion thereof after having placed the tire on the fixed portion, it can readily be seen when the pin 32 is in the correct position to engage the tubular socket 33, the end of which socket is preferably flared as shown.

The end of the hub 5 may be provided with a screw cap 34, which is removed therefrom prior to removing the outer disk 7 of the wheel, and an abutment which may take the form of a sleeve 35 may be provided on the hub, against which abutment the inner end of the tubular screw-threaded sleeve 10 bears when the parts of the wheel are *in situ*.

Although a device for locking the retaining plate 25 has been described, such locking device may be dispensed with, as it has been found in practice that when the tire has been placed upon the rim and inflated, the pressure of the beads upon the tire-retaining flanges tending to force the rim parts away from one another, causes a considerable amount of friction between the said plate 25 and the pins 4, that the likelihood of the plate 25 rotating so as to allow the pins to leave the slots 9 is small. The employment of the locking device however, insures, for the reason previously described, that the plate 25 has been rotated a sufficient distance, and makes it impossible for the said plate to be rotated to release the pins 4 until the locking device has been released by removing the cover 17 of the aperture 16.

What I claim as my invention and desire to secure by patent is:—

1. In a wheel for road vehicles; the combination with a hub, an inner tire-retaining flange fixed to said hub, a flat outer ring extending inwardly of said inner tire-retaining flange, a plurality of radially projecting pins fixed to the inner periphery of said outer ring; of a removable outer tire-retaining flange, an inner flat ring extending inwardly from said outer tire-retaining flange and having a plurality of slots extending for a distance from the inner edge of said inner ring only in a direction parallel with the axis of the wheel, said slots being so arranged as to be engaged by said inwardly projecting pins on said outer ring when the inner ring is moved in an axial direction within the outer ring, means for insuring the correct position of the said pins and slots when placing said inner ring within said outer ring, and means for locking said pins in said slots to secure said inner ring to said outer ring.

2. In a wheel for road vehicles; the combination with a hub, an inner tire-retaining flange fixed to said hub, a flat outer ring extending inwardly of said inner tire-retaining flange, a plurality of radially projecting pins fixed to the inner periphery of said outer ring; of a removable outer tire-retaining flange, an inner flat ring extending inwardly from said outer tire-retaining flange, an inturned flange on the inner edge of said inner ring, through which inturned flange and said inner ring slots extend in a direction parallel with the axis of the wheel for a distance from the inner edge of said ring, said slots being so arranged as to be engaged by said radially projecting pins on said outer ring when said inner ring is slid into said outer ring in the direction of the axis of the wheel, an annular plate located and adapted to be turned in an angular direction within said inner ring, said plate having a plurality of outer peripheral notches adapted in a certain position of said plate to register with the slots in the said inner ring, means for retaining said annular plate against the inner face of said inturned flange, means for effecting the angular movement of said plate within said inner ring to close entrances to said slots in said inner ring to retain said radial pins in said slots when the inner ring has been placed within the outer ring to connect the said rings together, and means for insuring the correct relative position of the said radial pins and slots when connecting said inner and outer rings.

3. In a wheel for road vehicles; the combination with a hub, a disk fixed to the inner end of said hub, a flat outer ring connected to the outer edge of said disk and extending in an axial direction toward the outer end of said hub, an inner tire-retaining flange on the outer edge of said outer ring, a plurality of radially projecting pins fixed to the inner periphery of said outer ring; of a second disk adapted to be removably connected to the outer end of said hub, an inner flat ring connected to the inner surface of said second disk at the outer edge thereof and extending inwardly therefrom, an inturned flange on the inner edge of said inner ring, through which inturned flange and said inner ring slots extend in a direction parallel with the axis of the wheel, said slots being so arranged as to be engaged by said radially projecting pins on said outer ring when said inner ring is slid in the direction of the axis of the wheel within said outer ring, an outer tire-retaining flange fixed to the outer edge of said second disk, means carried within said inner ring for locking said radial pins on the outer ring within the slots in the inner ring for connecting said inner and outer rings, and means for insuring the correct position of said pins and slots when placing said inner ring within said outer ring.

4. In a wheel for road vehicles; the combination with a hub, an inner tire-retaining flange fixed to said hub, a flat outer ring extending inwardly of said inner tire-retaining flange, a plurality of radially projecting pins fixed to the inner periphery of said outer ring; of a removable outer tire-retaining flange, an inner flat ring extending inwardly from said outer tire-retaining flange, an inturned flange on the inner edge of said inner ring, through which inturned flange and said inner ring slots extend in a direction parallel with the axis of the wheel for a distance from the inner edge of said ring, said slots being so arranged as to be engaged by said radially projecting pins on said outer ring when said inner ring is slid into said outer ring in the direction of the axis of the wheel, an annular plate located and adapted to be turned in an angular direction within said inner ring, said plate having a plurality of outer peripheral notches adapted in a certain position of said plate to register with the slots in the said inner ring, means for retaining said annular plate against the inner face of said inturned flange, means for effecting the angular movement of said plate within said inner ring to close entrances to said slots in said inner ring to retain said radial pins in said slots when the inner ring has been placed within the outer ring to connect the said rings together, means for preventing the angular movement of the annular plate when said plate has been moved to retain said radial pins in said slots, and means for insuring the correct relative position of the said radial pins and slots when connecting said inner and outer rings.

5. In a wheel for road vehicles; the combination with a hub, a disk fixed to the inner end of said hub, a flat outer ring connected to the outer edge of said disk and extending in an axial direction toward the outer end of said hub, an inner tire-retaining flange on the outer edge of said outer ring, a plurality of radially projecting pins fixed to the inner periphery of said outer ring; of a second disk adapted to be removably connected to the outer end of said hub, an inner flat ring connected to the inner surface of said second disk at the outer edge thereof and extending inwardly therefrom, an inturned flange on the inner edge of said inner ring, through which inturned flange and said inner ring slots extend in a direction parallel with the axis of the wheel, said slots being so arranged as to be engaged by said radially projecting pins on said outer ring when said inner ring is slid in the direction of the axis of the wheel within said outer ring, an outer tire-retaining flange fixed to the outer edge of said second disk, an annular plate located and adapted to be turned in an angular direction within said inner ring, said plate having a plurality of outer peripheral notches adapted in a certain position of said plate to register with the slots in said inner ring and having a notch in its inner periphery, means for retaining said annular plate against the inner face of said inturned flange, means for effecting the angular movement of said plate within said inner ring to close entrances to said slots in said inner ring to retain said radial pins in said slots when the inner ring has been placed within the outer ring to connect the said rings together, means for engaging said inner peripheral notch to prevent the angular movement of the annular plate when said plate has been moved to retain said radial pins in said slots, and means for insuring the correct relative position of said radial pins and slots when connecting the inner and outer rings.

6. In a wheel for road vehicles; the combination with a hub, a disk fixed to the inner end of said hub, a flat outer ring connected to the outer edge of said disk and extending in an axial direction toward the outer end of said hub, an inner tire-retaining flange on the outer edge of said outer ring, a plurality of radially projecting pins fixed to the inner periphery of said outer ring; of a second disk adapted to be removably connected to the outer end of said hub and having a segmental aperture therein, a cover plate removably connected to said second disk to close said aperture, an inner flat ring connected to the inner surface of said second disk at the outer edge thereof and extending inwardly therefrom, an inturned flange on the inner edge of said inner ring, through which inturned flange and said inner ring, slots extend in a direction parallel with the axis of the wheel, said slots being so arranged as to be engaged by said radially projecting pins on said outer ring when said inner ring is slid in the direction of the axis of the wheel within said outer ring, an outer-tire-retaining flange fixed to the outer edge of said second disk, an annular plate located and adapted to be turned in an angular direction within said inner ring, said plate having a plurality of outer peripheral notches adapted in a certain position of said plate to register with the slots in said inner ring and having a notch in its inner periphery, means for retaining said annular plate against the inner face of said inturned flange, means for effecting the angular movement of said plate within said inner ring to close entrances to said slots in said inner ring to retain said radial pins in said slots when the inner ring has been placed within the outer ring to connect the said rings together, a bracket projecting inwardly from said second disk and located at the side of said segmental aperture, a two-armed lever pivotally connected to said bracket, one arm of which is adapted to engage said inner peripheral notch in said annular plate, to prevent the angular movement of the annular plate when said plate has been moved to retain said radial pins in said slots, the other arm of said two-armed lever being adapted to project through said segmental aperture in said second disk to prevent the said cover plate from closing said aperture until the engagement of the other arm of the lever with the said inner peripheral notch has been effected, and means for insuring the correct relative position of said radial pins and slots when connecting said inner and outer rings.

7. In a wheel for road vehicles; the combination with a hub, a disk fixed to the inner end of said hub, a flat outer ring connected to the outer edge of said disk and extending in an axial direction toward the outer end of said hub, an inner tire-retaining flange on the outer edge of said outer ring, a plurality of radially projecting pins fixed to the inner periphery of said outer ring; of a second disk adapted to be removably connected to the outer end of said hub, an inner flat ring connected to the inner surface of said second disk at the outer edge thereof and extending inwardly therefrom, an inturned flange on the inner edge of said inner ring, through which inturned flange and said inner ring slots extend in a direction parallel with the axis of the wheel, said slots being so arranged as to be engaged by said radially projecting pins on said outer ring when said inner ring is slid in the direction of the axis of the wheel within said outer ring, an outer tire-retaining flange fixed to the outer edge of said second disk, an annular plate located and adapted to be turned in an angular direction within said inner ring, said plate having a plurality of outer peripheral notches adapted in a certain position of said plate to register with the slots in said inner ring and having a notch in its inner periphery, means for retaining said annular plate against the inner face of said inturned flange, means for effecting the angular movement of said plate within said inner ring to close entrances to said slots in said inner ring to retain said radial pins in said slots when the inner ring has been placed within the outer ring to connect the said rings together, means for engaging said inner peripheral notch to prevent the angular movement of the annular plate when said plate has been moved to retain said radial pins and said slots, a socket projecting inwardly from the face of said fixed disk in a direction parallel with the axis of the wheel and a pin projecting inwardly from the inner face of the said second disk, said pin being adapted to engage said socket when the said second disk is in the correct position for the slots in said inner ring carried thereby to register with said radial pins projecting inwardly from the outer ring carried by said fixed disk, and means for limiting the angular movement of said annular plate within said inner ring.

In witness whereof I have hereunto set my hand in the presence of two witnesses.

EDGAR CHARLES HORNER.

Witnesses:
 THOMAS WILLIAM ROGERS,
 WILLIAM A. MARSHALL.